(12) United States Patent
Thompson et al.

(10) Patent No.: US 10,838,475 B2
(45) Date of Patent: Nov. 17, 2020

(54) SYSTEM AND METHOD FOR MANAGEMENT OF DATA AND POWER OF A DATA ACQUISITION DEVICE

(71) Applicant: FLIR Commercial Systems, Inc., Goleta, CA (US)

(72) Inventors: Edwin Thompson, Campbell Hall, NY (US); Chaim Shain, Parkland, FL (US); Lior Ohana, Netanya (IL)

(73) Assignee: FLIR COMMERCIAL SYSTEMS, INC., Goleta, CA (US)

( * ) Notice: Subject to any disclaimer, the term of this patent is extended or adjusted under 35 U.S.C. 154(b) by 1220 days.

(21) Appl. No.: 14/955,071

(22) Filed: Dec. 1, 2015

(65) Prior Publication Data
US 2017/0153679 A1    Jun. 1, 2017

(51) Int. Cl.
*G06F 1/26* (2006.01)
*G06F 3/06* (2006.01)
*G06F 1/16* (2006.01)

(52) U.S. Cl.
CPC .......... *G06F 1/266* (2013.01); *G06F 1/1632* (2013.01); *G06F 3/0604* (2013.01); *G06F 3/067* (2013.01); *G06F 3/0658* (2013.01)

(58) Field of Classification Search
CPC ...... G06F 1/266; G06F 1/1632; G06F 3/0604; G06F 3/0658
See application file for complete search history.

(56) References Cited

U.S. PATENT DOCUMENTS

| | | | |
|---|---|---|---|
| 2005/0208967 A1* | 9/2005 | Buniatyan | G06F 11/1456 455/557 |
| 2009/0172384 A1* | 7/2009 | Anson | G06F 9/44505 713/2 |
| 2012/0008460 A1* | 1/2012 | Crice | G01V 1/24 367/37 |
| 2012/0139474 A1* | 6/2012 | Cho | G09G 3/2092 320/106 |
| 2012/0297211 A1* | 11/2012 | Lee | G06F 8/65 713/310 |
| 2016/0065908 A1* | 3/2016 | Chang | G06F 12/0246 348/158 |
| 2016/0195912 A1* | 7/2016 | Hsi | G06F 13/4282 713/310 |
| 2016/0330607 A1* | 11/2016 | Duchan | H04W 12/06 |
| 2017/0060185 A1* | 3/2017 | Conners | H04M 1/72527 |

* cited by examiner

*Primary Examiner* — Tim T Vo
*Assistant Examiner* — Harry Z Wang
(74) *Attorney, Agent, or Firm* — Haynes and Boone, LLP

(57) ABSTRACT

A system and method for management of data and power of a data acquisition device may include a power and storage module (PSM) comprising a memory and a power source unit, the PSM adapted to provide power to a data acquisition portable device (DAPD) and to store data received from the DAPD and a docking unit adapted to charge the power source unit and to perform at least one of: reading information from the memory and writing information to the memory. Charging the power source unit and transferring data to/from the memory may be done substantially at the same time and by the same docking unit.

23 Claims, 3 Drawing Sheets

SYSTEM AND METHOD FOR MANAGEMENT OF DATA AND POWER OF A DATA ACQUISITION DEVICE

FIELD OF THE INVENTION

The present invention relates generally to a data acquisition device. More specifically, the present invention relates to providing electrical power and digital storage memory to a data acquisition portable and/or wearable device.

BACKGROUND OF THE INVENTION

Today, it is commonplace for portable electronic devices such as cameras and drones to include a battery and a memory module or unit for storing digital data, e.g., to record video, audio and/or photographs. While in use, these devices deplete the battery power as well as the digital data storage capacity and both (data storage and power) require replenishment at differing intervals depending on the capacities of each and the utilization rate of the portable device.

It is up to the user of the device to keep track of these independent capacities (power and storage) and to know when they need replenishment, which is often at different times, thus requiring operation of a device to be interrupted as each is independently depleted.

When the data capacity is depleted, there are specific, and sometimes proprietary, procedures for transferring the data either physically by exchanging a data storage component or by electronic transfer using a network and software. In any case, the end user must become familiar with the procedures to access the data storage or data transfer methodologies for a specific device as each portable device may have different ways of transferring data to/from the device.

For example, in police work today it is commonplace for a police officer to be issued a radio communications device at the beginning of a shift and return the device at the end of his shift to a common location where the batteries are recharged or replaced. The radio battery is usually removed and replaced with a fresh battery so that the radio can be reissued for the next shift which reduces the number of radios and associated cost required to equip a given precinct or department. If the planned usage of the radio for a given mission is longer than the battery is expected to last, the officer can carry spare batteries to extend the operation of the unit indefinitely. This is the extent to which the officer needs to be familiar with deplete-able components of their radio system. There is no data storage or transfer knowledge required to effectively utilize the radio system and this simplifies operation and learning curve.

One of the newest technologies now being adopted by police and other first responders is the "body camera" which is a portable video camera with a battery and data storage capabilities. This technology shares the battery depletion and replacement philosophy of other portable devices, but also contains data storage which must be managed separately. The end user must be aware of the data storage capacity which will also be depleted and requires knowledge of data transfer methodologies in order to sustain continuous usage. In the case of police video, the data also has unique "chain of custody" requirements which link the user's identity to the video evidence contained in the data storage and for large multi-precinct deployments, this requires significant training and evidentiary management burden when compared to their radio systems.

Some devices include removable data storage which can become lost or mixed with other data storage devices while other devices do not allow or enable the data storage unit to be removed from the device. With non-removable storage, the portable device must be allowed time to transfer the data requiring both the knowledge to complete the transfer while maintaining the chain of custody, as well as device downtime for the transfer which can prevent the unit from being ready for the next shift. Some devices also have non-removable batteries which extends the downtime while connected to a charger.

There are many methods used today for charging batteries of, and transfer data to/from, portable devices. For example, charging docks allow portable devices to be connected to a device which connects power and data to the portable device for charging, operation and transfer of data. Charging docks are often used for consumer cameras and some computers. However the drawback of using these is that they require the portable device to remain attached while charging and transferring the stored data. This prevents the sharing of the device in a manner similar to the police radios which can be in continuous use via a system of interchangeable batteries.

Other systems or portable devices support swappable batteries and separate data cards to extend their operations indefinitely. However, these capacities are independent and require monitoring of the individual replenishment requirements which can vary significantly by device. Further, if the data has chain of custody requirements, the removable data components can be lost, or mixed with other data components, thus ruining the chain of custody control of the data.

In other cases, power and data cables are connected to a portable device to support the same capabilities as the charging station but have the same drawback of requiring the device to remain connected while charging and transferring data.

In cases where the battery or data card cannot be removed it is common to assign a device to a user for the duration of the device's useful deployment life and assign responsibility for proper chain of custody and replenishment of depleteable capacities to the assigned user. While this may be practical for small organizations, it is expensive when the organization, such as a police department, operates on shifts and the portable devices are not shared like radios. Without sharing, the ratio of users to devices is 1 to 1 while in the case of portable radios the ratio is closer to 3 to 1 which can dramatically reduce the cost of deployments.

To overcome the problems of managing the power and data storage replenishment as well as the chain of custody, many portable data recording devices require a significant level of proprietary training before the requirements can be met. In many business and government operations, meeting the training and proficiency requirements remains the bottleneck to effective deployments and the training must be continuously available as personnel turnover in large organizations is a constant training challenge. Success is often a measure of simplicity as, demonstrated by portable radio industry, which has largely solved the battery management problem with little to no additional user training.

SUMMARY OF THE INVENTION

A system and method for management of data and power of a data acquisition device may include a power and storage module (PSM) comprising a memory and a power source unit, the PSM adapted to provide power to a data acquisition portable device (DAPD) and to store data received from the DAPD and a docking unit adapted to charge the power source unit and to perform at least one of: reading information from the memory and writing information to the memory. Charging the power source unit and transferring data to/from the memory may be done substantially at the same time and by the same docking unit.

A system and method may include a docking unit operatively connected to a network and adapted to transfer, to a server on the network, data received from the DAPD. The docking unit may be adapted to store configuration data in the memory and a controller included in the DAPD may be adapted to use the configuration data to configure the DAPD. A PSM may be a detachable unit adapted to be installed in a DAPD or in a docking unit. A DAPD may include a unique identification code and the docking unit may be adapted to dynamically associate the unique identification code with a user.

A docking unit may be adapted to use the unique identification code in order to associate data received from the DAPD with the user. The docking unit may be adapted to determine and report a status of at least one of: the memory and the power source unit included in the PSM. The docking unit may be adapted to update software in a memory of the PSM based on data received from a server on a network.

The DAPD and the docking unit may be adapted to encrypt and decrypt data stored on the PSM. The DAPD may be connected to, or disconnected from, the PSM, while the PSM is installed in a docking unit. Configuration data stored on a PSM may include data related to an operation of a DAPD and data related to one or more user profiles and an operation of the DAPD may be controlled based on the data related to an operation of the DAPD and a profile selected from the one or more user profiles.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
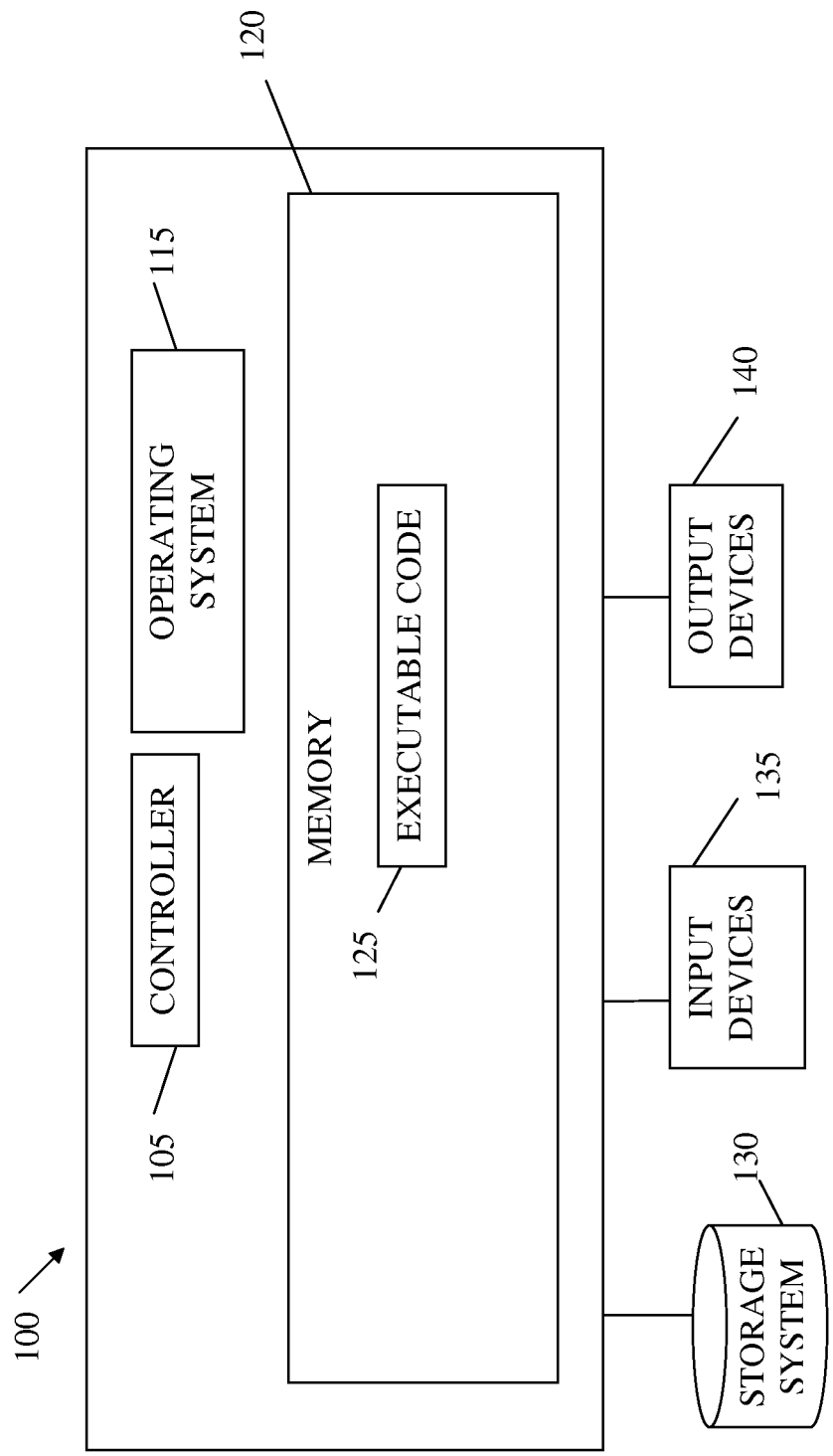
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may include a data acquisition portable device (DAPD) that may be for example any portable or wearable device and a power and storage module (PSM). Generally, a DAPD may be, or may include components of, computing device 100. For example, a DAPD may include a controller 105 and a memory 120. In some embodiments, the PSM may be used in order to store data captured by the DAPD. In some embodiments, the PSM may be used in order to store data used by the DAPD. In some embodiments, the PSM may be used in order to provide power to the DAPD. In some embodiments, a PSM includes both a power source and a memory, accordingly, a PSM may provide a DAPD with both power and storage. For example, a rechargeable battery in a PSM may provide a DAPD with power and a memory in a PSM may be used, by the DAPD, for storing captured video, stills and audio recordings as well as for storing configuration parameters.

For example, in some embodiments, a DAPD (e.g., DAPD 210 shown in FIG. 2) may include a camera and a microphone and may use such data acquisition units in order to capture images or video clips and/or sound.

For example, in some embodiments, a storage unit or component included in a PSM may be a memory chip or other memory unit adapted to store digital information as known in the art. For example, data such as digital video and audio content collected, recorded or captured by a DAPD may be stored in a memory of a PSM. In some embodiments, a power unit included in a PSM may be a rechargeable battery or any other component adapted to provide or supply electrical power to a DAPD.

Figure 2:
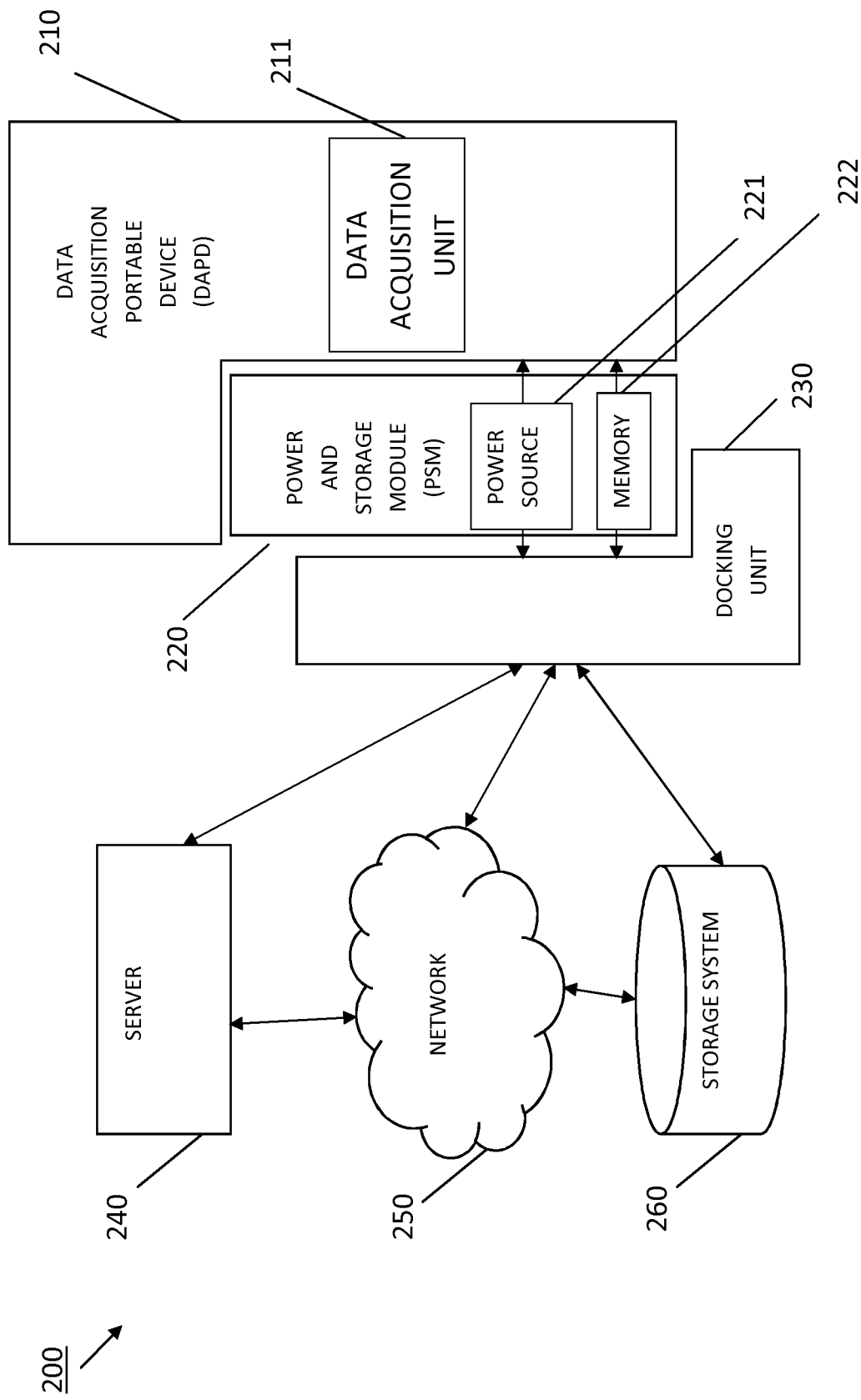
FIG. 2 is a block diagram of a system according to illustrative embodiments of the present invention.

For example, a PSM may include a power source (e.g., power source 221 as shown in FIG. 2) and may provide a connected DAPD with electrical power drawn from the power source. A PSM may include a memory, e.g., memory 222 shown in FIG. 2, that may be any memory adapted to store digital information, e.g., a flash memory as known in the art, and a PSM may store data received from a connected DAPD in the memory.

For example, a DAPD may be a wearable platform, device or system and a memory in a PSM may be a data storage memory used for recording video/audio and for storing device firmware, configuration parameters, business logic updates etc. As described, a PSM used with a wearable DAPD according to some embodiments of the invention may enable rapid redeployments of wearable or other data acquisition devices during, for example, police shift-changes without the precinct level personnel having to be aware of the process of video or firmware transfers. A PSM and compatible charging or docking system according to some embodiments of the invention may transparently facilitate data transfer and data management operations while a rechargeable battery within the PSM is being charged.

For example, when a PSM including a power source and a memory is connected to, or installed in a docking station, a system and method according to the invention may charge a battery in the PSM while downloading data from a memory in the PSM. As described, a PSM may be installed in, or connected to, a docking station, when connected to, or installed in, a DAPD. Accordingly, a single unit or component (e.g., a PSM) may provide a DAPD with power and digital storage. The single unit or component (e.g., a PSM) may be detached from a DAPD, attached to, or installed or placed in, a docking station and, while a battery in the unit or component is charged, by the docking station, data from the unit or component may be downloaded, e.g., by docking unit 230 to storage system 260. Accordingly, a system and method according to embodiments of the invention may use a single power and storage module (e.g., a PSM 220 as described) to provide power and digital storage to a data acquisition portable device (e.g., a DAPD 210 as described) when the module is attached to the DAPD. As described, the single module may be charged while data stored in the module is read or downloaded.

The advantages of a system and method according to embodiments of the invention that use, or include, a single unit or component (e.g., a PSM as described), a DAPD and a docking station as described over may be appreciated when compared to systems and methods that provide power and storage using separate, or different units.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in a system according to some embodiments of the invention.

For example a DAPD and a docking station described herein may be, or may include components of, computing device 100. For example, according to some embodiments of the invention, a DAPD may include a controller 105, a memory 120, executable code 125, input devices 135 and output devices 140. According to some embodiments of the invention, a PSM may include a power source, a storage system 130, a memory 120 and executable code 125 usable by a controller of an attached DAPD. In another example, by executing executable code 125 stored in memory 120, controller 105 in a docking station may be configured to carry out a method of management of data and power of a DAPD. In some embodiments of the invention, controller 105 in a DAPD may be configured to read data stored in a memory 130 in a PSM by a controller 105 in a docking station and use the data to configure the DAPD or control operation of the DAPD as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application, executed by a controller in a DAPD, that stores a unique identification code in a memory of a PSM as further described herein. Executable code 125 may be, or may include, an application, executed by a controller in a docking unit, that reads a unique identification code from a memory of a PSM and associates data read or downloaded from a memory of a PSM based on the unique identification code.

Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., docking unit 230, DAPD 210) may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Reference is made to FIG. 2, a block diagram of an exemplary system 200 according to some embodiments of the present invention. As shown, a system may include a DAPD 210, a PSM 220 and a docking unit 230. As shown, DAPD may include a data acquisition unit 211. As shown, PSM 220 may include a memory unit 222 and a power source 221. For example, power source 221 may be a rechargeable battery as known in the art. As shown, docking unit 230 may be operatively connected to a server 240 and/or to a network 250 and/or to a storage system 260. DAPD 210 and docking unit 230 may be, or may include components of, computing device 100. For example, DAPD 210 and docking unit 230 may include a controller 105 and a memory 120 as described herein.

Network 250 may be, may comprise or may be part of a private or public IP network, or the internet, or a combination thereof. Additionally or alternatively, network 250 may be, may comprise or may be part of, a global system for mobile communications (GSM) network. For example, network 250 may include or comprise an IP network such as the internet, a GSM related network and any equipment for bridging or otherwise connecting such networks as known in the art. In addition, network 250 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 250 are implied but not shown, e.g., access points, base stations, communication satellites, GPS satellites, routers, telephone switches, etc. It will be recognized that embodiments of the invention are not limited by the nature of network 250.

Storage system 260 may be, or may include, for example, a set of hard disk drives, a Compact Disk (CD) drive, a Blu-ray disk (BD), a universal serial bus (USB) device or other suitable removable and/or fixed storage unit. Server 240 may be any suitable computing device, e.g., a web or other server as known in the art. Although not shown, server 240 may be connected to network 250 and docking unit 230 may write data to server 240 and/or to storage system 260 and/or read data from server 240 over network 250.

As described herein DAPD 210 may be a wearable, portable and/or a carry-on device adapted to acquire data. For example, in some embodiments, DAPD 210 may be a wearable device, e.g., a small device that can be worn on a user's wrist (e.g., using a strap) or a small device that can be pinned to shirt or placed in a pocket. In some embodiments, DAPD 210 may be a stationary device (e.g., placed at a location of an event and picked up when an event ends), in other embodiments, DAPD 210 may be a remotely controlled device, e.g., a drone as known in the art. Accordingly, it will be understood that the scope of the invention is not limited by the type of device used for carrying sensors and recording sensors output as described with respect to DAPD 210.

As described, DAPD 210 may include a data acquisition unit 211 that may be, or may include, for example, a camera and a recorder that may be adapted to digitally record video and/or audio content as known in the art. DAPD 210 or data acquisition unit 211 may include various sensors and DAPD 210 may be adapted to store or record any data generated by sensors included in data acquisition unit 211. Any number of data acquisition units 211 may be included in a DAPD 210. For example, in addition to visual an audio sensors, DAPD 210 may include a clock, a temperature sensor, a location sensing or determining component (e.g., a global positioning system (GPS)) and the like. Any data generated by sensors or components included in DAPD 210 may be stored on a memory component in the PSM 220 that may be installed or included, in DAPD 210 as described.

PSM 220 may be a unit or module that includes a power source (e.g., a rechargeable battery) and a digital storage component or unit, e.g., a flash memory, a USB component, a memory chip and the like. Docking unit 230 may include connections or port(s) usable for charging the power source included in PSM 220. Docking unit 230 may include connections or port(s) usable for transferring data between PSM 220 and docking unit 230. For example, when PSM 220 is placed on, installed in, or mounted on docking unit 230, docking unit 230 may automatically charge a rechargeable battery or other power unit in PSM 220 and may further automatically read data from a memory in PSM 220 and/or automatically write data to a memory in PSM 220. For examples, plugs or metal contacts on PSM 220 may enable PSM 220 to draw electric power from docking unit 230 and to transfer data from memory 222 to docking unit 230. Plugs or metal contacts on PSM 220 may enable PSM 220 to provide electric power to DAPD 210 and to receive data from DAPD 210, e.g., as known in the art.

In some embodiments, DAPD 210 includes a global unique identification number (GUID). For example, a system may generate a set of GUID's and a different GUID may be written into a memory chip in each DAPD 210. For example, a ROM in DAPD 210 may be made to include a GUID as known in the art.

In some embodiments, when a DAPD 210 is issued to a user, the GUID of the DAPD 210 is associated with the user. For example, two DAPD 210 units with respective GUID's 17 and 29 may be issued to two respective police officers, e.g., Jack and Jill. In this exemplary case, GUID 17 may be associated with Jack and the GUID 29 may be associated with Jill. For example, using a keyboard connected to docking unit 230 (or connected to a server, not shown), a user may record, e.g., in a database, that Jack was issued DAPD 210 with GUID 17 and that Jill was issued DAPD 210 with GUID 29. For example, a GUID of a DAPD 210 may be stamped on the DAPD 210 such that it may be easily seen and, when the DAPD 210 is given or issued to an officer, the GUID may be entered into, or stored in, a database in association with an identifier of the officer (e.g., using a table or list as described herein).

In some embodiments, association of a user and a DAPD 210 using a GUID as described may be, or may include, updating a database. For example, storage system 260 may include a database (e.g., any commercial or proprietary database as known in the art) and associating a user with a DAPD 210 may include recording, in the database, that DAPD 210 with a specific GUID was issued to a specific user. Other details may be recorded, e.g., when or where the DAPD 210 was issued to the user and so on.

For example, with respect to the above example, associating users with issued DAPD 210 units may include recording information in a list in a database (e.g., in storage system 260) that may include the below entries:

TABLE 1

| GUID | Name | Time | Date | Location | Role/Profile |
| --- | --- | --- | --- | --- | --- |
| 17 | Jack | 11:12 | Nov. 29, 2015 | precinct 11 | Street Patrol |
| 29 | Jill | 15:03 | Nov. 28, 2015 | precinct 12 | Internal affairs investigation |

As described, in some embodiments, a PSM 220 may be a detachable unit or component that can be attached to and/or detached from, a DAPD 210. For example, after a PSM is issued to a police officer, the officer may attach the issued PSM 220 to his DAPD 210 and the attached PSM 210 may provide the officer's DAPD 210 with power and store data produced by the officer's DAPD 220 during a shift. At the end of a shift, the officer may detach the PSM 220 from the DAPD 210 and the detached PSM 220 may be placed in docking unit 230 where its power source may be recharged while data from its memory is downloaded. For example, after attaching a PSM 220 to a DAPD 210, the two components may be handled as a single device (e.g., a PSM 210 may be placed in a covered or sealed cavity in a DAPD 210). According to embodiments of the invention, a controller or processor included in DAPD 210 may be configured or adapted to write the GUID of the DAPD 210 to a PSM 220 installed in the DAPD 210. For example, in some embodiments, when a PSM 220 is inserted into a DAPD 210, a controller in DAPD 210 copies the GUID from its memory (e.g. ROM) into a predefined address or offset in a memory of the installed PSM 210. For example, a controller in DAPD 210 may be configured to detect a replacement, connection or attachment of a new PSM 220 in DAPD 210 and, upon detection of attachment, connection, replacement or insertion of a PSM 220, the controller in DAPD 210 may read the GUID from a ROM in DAPD 210 and write the GUID to a predefined address in a memory in PSM 220.

The location or address of the GUID in a memory of a PSM 220 may be known to docking unit 230. In addition, docking unit 230 may be configured to access a database where associations of GUID's and users are stored as described. Accordingly, when reading data from a PSM 220, docking unit 230 may store the data with respect or reference to a specific user.

For example, when a PSM 220 is connected to docking unit 230, docking unit may read, from the predefined address in the memory of the PSM 220, the GUID stored therein by the controller of the relevant DAPD 210. Docking unit 230 may search a database. In some embodiments, docking unit 230 may transfer or send data extracted from PSM 220 to a storage system (e.g., to server 240 or to storage system 260) either directly or via a network. Data extracted from PSM 220 may be processed by a server. For example, processing of data read or extracted from PSM 220 may include relating a GUID read from PSM 220 to a user and to data generated while PSM 220 was in possession of the user. Accordingly, docking unit 230 may perform extraction of data from a DAPD 210 (or from a PSM 220 included therein) and sending the data to a storage system or server where the data may be stored. A server may process the data in order to determine, or infer, the relationships between a user, DAPD 210, PSM 220 and data generated, extracted and stored as described.

For example, docking unit 230 may read a GUID from an attached PSM 220 and search for the GUID in Table 1 shown and described above. Accordingly, using a GUID obtained from a PSM 220, docking unit 230 may readily identify the user to whom the DAPD 210 was issued. In other cases, docking unit 230 may use a GUID extracted from a PSM 220 as a key in a query to a database and the response to the query may be the user name or any other information related to the use, e.g., any information stored in Table 1.

It will be noted that, in order to read, download or otherwise obtain a GUID from a PSM 220, docking unit 230 does not require DAPD 210 to be connected to the PSM 220 or to docking unit 230. A PSM 220 may be attached to a docking unit 230 without being attached or connected to a DAPD 210. For example, a first PSM 220 may be detached from a DAPD 210 and placed in docking unit 230 and a second PSM 220 may be attached to the DAPD 210 such that usage of a DAPD 210 is optimized. In another case, an officer may carry more than one PSM's 220 and may replace, or attach, a number of PSM's 220 during a mission. Since the same GUID may be written on all PSM's 220 attached to the same DAPD 210, docking unit 230 may associate, connect, or assign data in the plurality of PSM's 220 with the same officer, mission and so on.

Provided with, or having obtained, a user identification as described, docking unit 230 may store data read, or downloaded, from a PSM 220, with reference to the user. Accordingly, chain of custody may be automatically maintained. For example, data collected by a DAPD 210 when used by a first officer may be stored with a reference to the first officer and thus may be associated with the first officer. Similarly, data collected by the same DAPD 210 when used by, or issued to, a second officer may be automatically associated with the second officer as described. Association of a user with data downloaded from a PSM 220 may be done as known in the art, e.g., a pointer or reference may be used in order to associate a file that contains data read from a PSM 220 with a record or file of an associated user. In other cases, a list may include entries and each entry may include a reference to data downloaded from a PSM 220 and a reference to, or identification of, a user.

Charging a power source in a PSM 220 and downloading data from a PSM 220 may be simultaneous and automatic. For example, when a PSM 220 (either still connected to a DAPD 210 or detached therefrom) is placed in docking unit 230, docking unit 230 may automatically read the GUID in the memory of the PSM 220 and use the GUID to identify the relevant user as described. Docking unit 230 may download or read data from the PSM 220 and associate the downloaded data with the identified user. In addition and as described, charging of the power source in the PSM 220 may be automatically commenced when the PSM 220 is placed in docking unit 230. Accordingly both charging and data transfer may be done simultaneously and automatically.

In some embodiments, a first set of contacts (e.g., electrical contacts) may be used, by docking unit 230, in order to charge a PSM 220 and a second set of contacts may be used, by docking unit 230, in order to read data from, or write data to, a PSM 220. For example, a set of contacts as shown by the arrows connecting power source 221 with DAPD 210 and with docking unit 230 may be used to conduct power as described and a set of contacts as shown by the arrows connecting memory 222 with DAPD 210 and with docking unit 230 may be used to transfer data as described.

Accordingly, charging a PSM 220 and reading data from, or writing data to, the PSM 220 may be done at the same time and by the same docking unit. While systems for charging a power source and systems for downloading data from a memory are known in the art, by using a PSM 220 that includes a memory and a power source and further using a docking unit 230 as described, embodiments of the invention may enable simultaneously charging a unit such as a PSM 220 and reading data from the unit and/or writing data to the unit. Accordingly, management and maintenance of DAPD units may be greatly simplified. For example, by enabling detaching a PSM 220 from a DAPD 210 and attaching a new or fresh PSM 220 to the DAPD 210, the DAPD 210 may be immediately reused. For example, at the end of a shift, a PSM 220 used in the shift as described may be detached from a DAPD 210 and a new or fresh PSM 220 may be attached to the DAPD 210. For example, while data collected by a DAPD 210 in a first shift is downloaded from a PSM 220 and while the PSM 220 is recharged, another, new or fresh, PSM 220 attached to the DAPD 210 enables the DAPD 210 to be used in a second shift. Using a GUID as described, association of data downloaded from a PSM 220 with a user, location, role, mission, date and the like may be enabled as described.

Docking unit 230 may write data to the memory in a PSM 220. For example one or all of: a software upgrade, an operating system and/or operational and/or configuration data may be written by docking unit 230 into a memory of a PSM 220. A controller in DAPD 210 may be configured to read, and act according to, data written to PSM 220. For example, using a specific or predefined memory address or flag in a memory in PSM 220, docking unit 230 may indicate to a controller in DAPD 210 that new configuration data or updates are available. A controller in DAPD 210 may check (e.g., upon boot, periodically or otherwise) a flag or specific address in a memory of the PSM 220 in order to determine whether or not updates were placed in the PSM 220 by docking unit 230. Accordingly, updates or configurations of, or for, DAPD 210 may be automatically executed by system 200.

In some embodiments, software updates, configurations and the like may be received by docking unit 230, from server 240 or from a server on network 250 or from a database in storage system 260 and the updates or configurations may be applied to a PSM 220 when attached into docking unit 230. Updating software in a PSM 220 (e.g., in order to configure operation of a DAPD as described) may be selective. For example, based on a GUID of a PSM 220 placed in, or attached to, docking unit 230, docking unit 230 may select a software update or a configuration for the attached PSM 220. For example, docking unit 230 may update an operating system of all PSM 220 units with a GUID in the range of 100 to 190, configure PSM 220 units with a GUID in the range of 217 to 322 to use a specific resolution of recorded video data and so on. For example, after determining a GUID of an attached PSM 220, docking unit 230 may examine a table or list (e.g., stored in storage system 260) that specifies GUID ranges and operations to be performed (or configurations of the DAPD's to be applied or set) and may select one or more operations to perform based on the GUID of the attached PSM 220 and based on the list or table.

As described, configuration parameters and/or software updates may be written to a memory in a PSM 220 and may be used by a controller in a DAPD 210 when the PSM 220 is attached to the DAPD 210. For example, a low battery or memory alarm or indication produced by a DAPD 210 may be according to a configuration parameter stored in a PSM 220 by docking unit 230. Other operational modes or aspects may be configured. For example, a configuration parameter written to a PSM 220 by docking unit 230 may cause a DAPD 210 to operate in silent mode (e.g., produce no audible alarms or indications). In some embodiments, a profile may be used.

A profile as described herein may be or may include a set of configuration elements that may be used in order to configure a behavior or functionality of a DAPD 210. For example, a profile may be a file or other object stored in a PSM 220. For example, docking unit 230 may store a profile on a PSM 220 and a controller in a DAPD 210 may read the file and apply or use values or other data in the profile in order control operation of a DAPD 210. For example, a profile may be set for a range of GUID's. For example, a profile in storage system 260 may be set for, or associated with, a range of GUID's, e.g., GUID's from 200 to 350, accordingly, when a DAPD 210 is attached to docking unit 230, docking unit 230 may determine the GUID of the attached DAPD 210 and if the GUID is between 200 and 350, docking unit may configure the DAPD 210 according to the profile. For example, a profile may be or may include a set of configuration parameters, e.g., warning thresholds, video resolution, communication channels used, level of data encryptions and the like.

In some embodiments, profiles may be associated with the role of a user. For example, a profile may include a set of configuration values or parameters that may cause a DAPD 210 to act differently when assigned to a street patrol officer than when assigned to an internal affairs investigator who is gathering evidence against a bad officer. For example, based on a profile, a controller in a DAPD 220 may enable or disable components in a DAPD 220 (e.g., disable or enable light emitting diodes (LED), mute speakers etc.)

In another example, tactical personnel may not want the LEDs in a DAPD 210 to be illuminated as that may reveal their tactical position. In yet another example, a vehicle-based unit may, based on a profile, record continuously rather than wait for someone to push a record button.

Generally a profile may be designed for a distinct use-case of a DAPD 210 which many may share and the DAPD 210 may behave, function or operate based on a profile stored in a PSM 220 by docking unit 230. Profiles may also be used to comply with local laws or organized labor contracts which may stipulate under what circumstances and what types of data a DAPD 210 may record. For instance there may be stricter laws on audio recording than video recording, e.g., continuous recording may be allowed in certain jurisdictions while not in others.

A profile may be related to a user. For example, as described, a DAPD 210 may be issued to a user and the user to whom the DAPD 210 was given or issued may be recorded (e.g., by associating a user identification and a GUID). In some embodiments, upon receiving a user name or identification, docking unit 230 may check a database and find a user profile of the identified user. Provided with a user profile and an associated GUID of a DAPD 210 issued to the user, docking unit 230 may automatically configure the DAPD 210 according to the user's profile.

For example, if DAPD 210 with GUID 29 is issued to Jill as in the above example, then a database in storage system 260 may include an association of Jill with GUID 29. When docking unit 230 identifies or determines that a DAPD 210 with GUID 29 is attached to it (e.g., by reading a memory in PSM 220 in DAPD 210), docking unit 230 may search, in a database, a user associated with GUID 29. In the above exemplary case, docking unit 230 will find, e.g., in a database in storage system 260, that Jill is associated with GUID 29, and may configure the DAPD 210 according to a profile of, or associated with Jill. For example, a profile of a first user may indicate that data stored by a DAPD 210 in an installed PSM 220 needs not be encrypted and a profile of a second user may indicate that data stored by a DAPD 210 in an installed PSM 220 must be encrypted. In another case, a profile of a first user may indicate that the resolution of video captured by a DAPD 210 should by 1080P and a profile of a first user may indicate that the resolution of video captured by a DAPD 210 should by 720P. Accordingly, by storing configuration data in a PSM 220 by docking unit 230, and using the configuration data by a controller in a DAPD 210, a system and method may configure and/or control an operation of a DAPD 210 according to a profile of a user who is using the DAPD 210.

A controller in DAPD 210 may encrypt data stored in a PSM 220. For example, docking unit 230 may store an encryption key on a PSM 220 and a controller in DAPD 210 may use the key in order to encrypt data stored on a PSM 220 installed in the DAPD 210. As known in the art, a key used for encryption of data may be useless for decrypting the encrypted data, accordingly, docking unit 230 may safely store an encryption key on a PSM 220 and store a decryption key in a database. For example, in addition to a GUID, user details, time and location as described, a database entry may include a decryption key for decrypting data read or downloaded from a PSM 220 as described. Accordingly, in some embodiments, encrypted data stored in a PSM 220 can only be decrypted using a key stored in a secured place, e.g., using a key stored in storage system 260 that may be located inside a police precinct.

As described herein, in some embodiments, a single device or component (e.g., a PSM 220 described herein) includes both a power source and a memory. In some embodiments, the single component may be used by a data acquisition device (e.g., a DAPD 210 as described). In some embodiments, the single power/memory component may be detached from the data acquisition device. For example, a first PSM 220 may be detached from a DAPD 210 and a second PSM 220 may be attached to, or installed in, the DAPD 210. For example, an officer may carry three ("3") PSM 220 modules when going out to a mission and may use some or all of them during the mission (e.g., replace a first of the PSM 220 modules with a second one when the battery in the first one is empty). When the three PSM 220 modules are placed in a docking unit 230, data downloaded, by the docking unit 230, from all three PSM 220 modules may be automatically associated with the officer based on an association as described. For example, all data recorded by the DAPD 210 when used by the same officer will be associated with the officer. For example, all data downloaded from a DAPD 210 issued to an officer, e.g., files containing audio, video, location and time information, may be stored in a database such that they may all be provided when a request for data related to the officer is received by the database. For example, all data downloaded from two or more PSM 220 modules inserted into a DAPD 210 by an officer, during a single mission, may be associated with the officer based on the GUID of the DAPD 210. As described, a controller in DAPD 210 may write the GUID of the DAPD 210 onto the memory of an inserted PSM 220, accordingly, the two or more PSM 220 modules inserted into a DAPD 210 by the officer may all include the same GUID and thus data read from the two or more PSM 220 modules may be associated with the officer.

Figure 3:
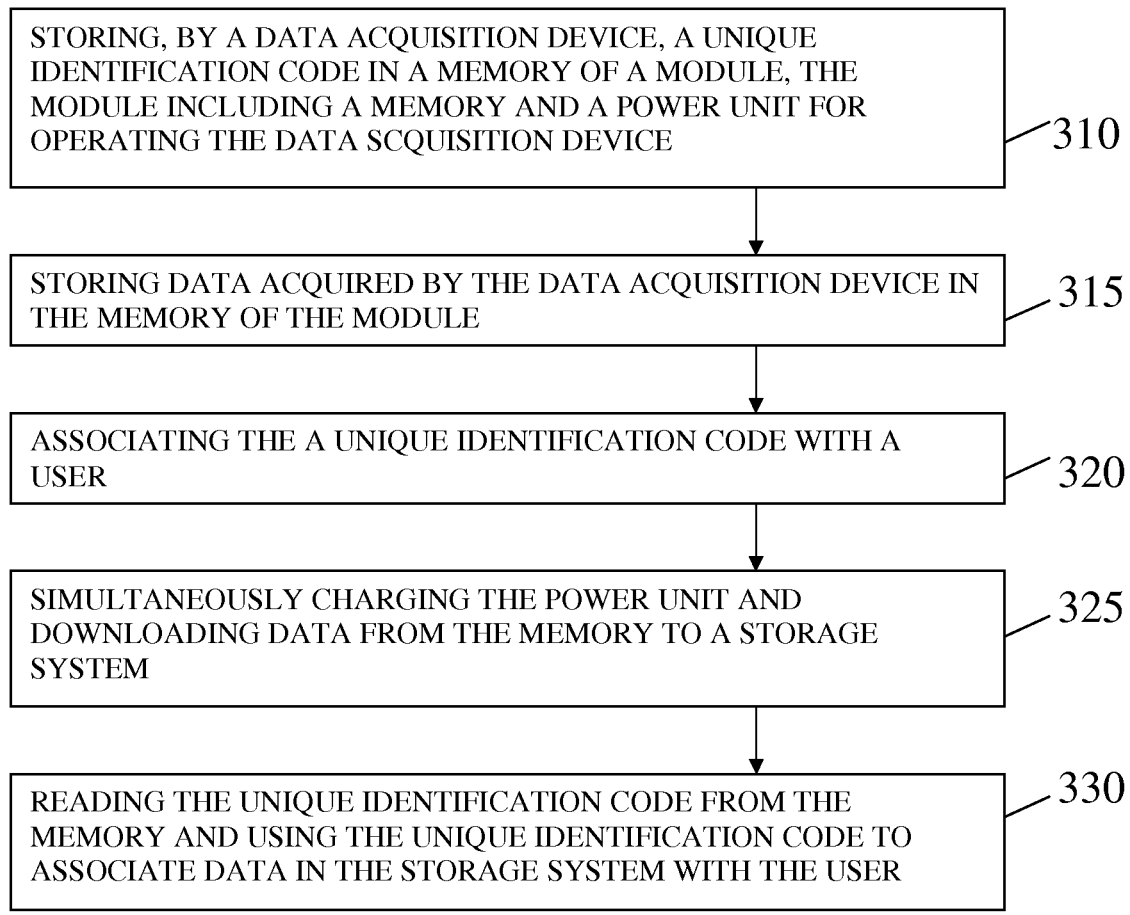
FIG. 3 shows a flowchart of a method according to illustrative embodiments of the present invention.

Reference is now made to FIG. 3, a flowchart of a method according to illustrative embodiments of the present invention. As shown by block 310 a unique (e.g., unique within an enterprise, or a police department, or unique in another manner) identification code may be stored in a memory of a module. For example, docking unit 230 may store a GUID in a memory of a PSM 210 as described. As further shown, the module may include a memory and a power source for operating a data acquisition device. For example, PSM 220 includes a memory and a power source for operating DAPD 210 as described.

As shown by block 315 data acquired by the data acquisition device may be stored in a memory of the module. For example, DAPD 210 stores data acquired in a memory of a PSM 220 installed in the DAPD 210. As shown by block 320, the unique identification code may be associated with a user. For example, an officer in a police precinct may be associated with a unique identification code of a DAPD 210 when the DAPD 210 is issued or given to the officer.

As shown by block 325, charging the power unit and downloading data from a memory of the module may be simultaneous. For example, docking unit 230 may simultaneously charge the power unit in a PSM 220 and download data from a memory in the PSM 220.

As shown by block 330 the unique identification may be read from a memory of the module and used in order to associate data downloaded from the module with the user. For example, docking unit 230 may read, from a memory in PSM 220, the GUID written by a controller of DAPD 210 and may use the GUID to associate data downloaded from the PSM 220 with the correct user as described.

As described herein, a PSM 220 may be a detachable unit adapted to be installed in a DAPD 210 and/or in a docking unit 230. For example, a PSM 220 may be attached to, or installed in, a DAPD 210 and/or in a docking unit 230. For example, a PSM 220 may be fitted into, connected to, or installed in a docking unit 230 while it is installed in a DAPD 210 or the PSM 220 may be first detached from the DAPD 210 and then installed in, or attached to, docking unit 230. Accordingly, charging a PSM 220, downloading data from a PSM 220 and writing data to a PSM 220 may be done while the PSM 220 is attached to a DAPD 210 or while the a PSM 220 is detached from a DAPD 210. Accordingly, a DAPD 210 may be connected to, or disconnected from, a PSM 220 while the PSM 220 is installed in, or connected to, a docking unit 230.

Docking unit 230 may examine a PSM 220 and report or record various details related to the PSM 220. For example, when a PSM 220 is connected to docking unit 230, docking unit 230 may determine a condition of the power source included in a PSM 220. For example, docking unit 230 may determine the capacity, voltage, charging level or other aspects of a battery included in PSM 220. Docking unit 230 may record, e.g., in a database, any information related to the power source in a PSM 220. Docking unit 230 may generate a report, indication or alert based on a condition of a power source in a PSM 220. For example, if the capacity or voltage of a power source in PSM 220 is below a predefined threshold, docking unit 230 may generate an alert (e.g., generate an audible alert; send a text message or email and the like). As known in the art, the life of a battery and a memory are finite and it may be advantageous to replace such or other components after a specified service time. In some embodiments, when a PSM 220 is attached to docking unit 230, docking unit 230 may record a history of the PSM 220, e.g., update a cycle count for the PSM 220 in a database.

Based on a history, cycle count or other record of a PSM and/or DAPD, docking unit 230 (or a server that examines the database where a history of PSMs and DAPDs is stored) may predict and/or recommend when a replacement of a component is to be made. For example, depending on the battery chemistry, the capacity of a battery will typically diminish over time even when not being used.

As described, when a PSM 220 is attached to docking unit 230, docking unit 230 may identify the PSM 220 (e.g., based on the GUID) and may record, in a history file of the PSM, the time and date and any operation performed with relation to the PSM, e.g., operations such as "data downloaded from memory", "battery recharged", "memory erased" etc. may be recorded. Docking unit 230 may run a test or check of a battery in an attached PSM 220. For example, testing a condition of a battery by drawing power from it and observing a drop of the current and voltage is known in the art. Docking unit 230 may use any system or method known in the art in order to test a battery or power source in an attached PSM and may further record the condition of the battery or power source.

Docking unit 230 or server 240 may provide service alarms, service reminders or service suggestions for a PSM and/or DAPD. For example, docking unit 230 or server 240 may suggest replacing a battery based on a condition of the battery or when determining a PSM attached to docking unit 230 has been in service for more than a year without replacing its battery.

Docking unit 230 may record, e.g., in a database, any information or metadata related to a memory in a PSM 220. For example, docking unit 230 may identify that a memory in a PSM 220 is full and may prompt a user to confirm deletion of data in the memory. In some embodiments, e.g., based on a configuration of docking unit 230, docking unit 230 may automatically delete data from a memory of a PSM 220 after safely copying the data and storing the data in a database as described. For example, if free space in a memory in a PSM 220 is below a threshold, In some embodiments, docking unit 230 may transfer all the recorded data in a PSM without regard for the memory utilization and may further set a "transfer complete" flag in the memory of a PSM thus indicating that it is now safe to write new data to the memory. Subsequently docking unit 230 may receive from network attached servers new profiles, DAPD software etc. to write into the memory. Docking unit 230 may automatically delete data from the memory or docking unit 230 may prompt a user to confirm deletion of data from the memory. It is noted that deletion may only be required if the data in the memory of a PSM has not been encrypted which in the preferred embodiment would be very rare. As described, in some embodiments, a "transfer complete" flag may be set and hence the memory containing encrypted data may simply be overwritten by the docking unit 230 and later by the DAPD. Accordingly, docking unit may automatically determine and report a status of a memory and a power source in a PSM 220 as well as automatically perform maintenance operations related to a memory and a power source in a PSM 220.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:
1. A system comprising:
    a docking unit;
    a power and storage module (PSM) comprising a memory adapted to store digital information and a power source unit, the PSM being attachable to the docking unit and to any data acquisition portable device (DAPD) of a plurality of DAPDs, the PSM being attachable to any DAPD being deployed for data acquisition without the PSM being attached/interacting for power/data transfer with the docking unit or the DAPD being attached/interacting for power/data transfer with the docking unit, the PSM being attachable to the docking unit without the PSM being attached/interacting for power/data transfer with a DAPD or the docking unit being attached/interacting for power/data transfer with a DAPD, wherein each DAPD includes a unique identification code, each DAPD having a behavior and/or functionality configurable by configuration data, wherein the PSM is adapted, when attached to any DAPD being deployed for data acquisition without the PSM being attached/interacting for power/data transfer with the docking unit or the DAPD being attached/interacting for power/data transfer with the docking unit, to provide power to the DAPD being deployed and to store, in the PSM's memory:
        data acquired by the DAPD being deployed; and
        the respective unique identification code received from the DAPD being deployed; and
    wherein the docking unit is adapted, at least when attached to the PSM without the PSM being attached/interacting for power/data transfer with any DAPD or the docking unit being attached/interacting for power/data transfer with any DAPD, to:
        charge the PSM's power source unit;
        read, from the PSM's memory, the data previously acquired by a DAPD;
        read, from the PSM's memory, a respective unique identification code previously received by the PSM;
        associate the respective unique identification code with a user profile;
        determine, based on the user profile, the configuration data to be provided to the corresponding DAPD, for configuring a behavior and/or functionality of the corresponding DAPD; and store the configuration data in the PSM's memory for being read out by the corresponding DAPD when the PSM is later attached to the DAPD without the PSM being attached/interacting for power/data transfer with the docking unit or the DAPD being attached/interacting for power/data transfer with the docking unit.

2. The system of claim 1, wherein;

each DAPD is a police radio or a body camera;

the docking unit is adapted to be operatively connected to a network and is further adapted to transfer, to a server on the network, data received from the DAPD.

3. A system comprising:

a power and storage module (PSM) comprising a memory adapted to store digital information and a power source unit, the PSM adapted to provide power to a data acquisition portable device (DAPD) and to store data received from the DAPD; and a docking unit adapted to charge the power source unit and to perform at least one of:

reading information from the memory and writing information to the memory;

wherein the docking unit is adapted to store configuration data in the memory and wherein a controller included in the DAPD is adapted to use the configuration data to configure the DAPD;

wherein the PSM is attachable to the DAPD being deployed for data acquisition without the PSM being attached/interacting for power/data transfer with the docking unit or the DAPD being attached/interacting for power/data transfer with the docking unit, the PSM being attachable to the docking unit without the PSM being attached/interacting for power/data transfer with the DAPD or the docking unit being attached/interacting for power/data transfer with the DAPD, wherein the DAPD includes a unique identification code, the DAPD having a behavior and/or functionality configurable by the configuration data, wherein the PSM is adapted, when attached to the DAPD being deployed for data acquisition without the PSM being attached/interacting for power/data transfer with the docking unit or the DAPD being attached/interacting for power/data transfer with the docking unit, to provide power to the DAPD being deployed and to store, in the PSM's memory:

data acquired by the DAPD being deployed; and the respective unique identification code received from the DAPD being deployed; and wherein the docking unit is adapted, at least when attached to the PSM without the PSM being attached/interacting for power/data transfer with the DAPD or the docking unit being attached/interacting for power/data with the DAPD, to:

charge the PSM's power source unit;

read, from the PSM's memory, the data previously acquired by the DAPD;

read, from the PSM's memory, a respective unique identification code previously received by the PSM;

associate the respective unique identification code with a user profile;

determine, based on the user profile, the configuration data to be provided to the DAPD, for configuring a behavior and/or functionality of the DAPD; and store the configuration data in the PSM's memory for being read out by the DAPD when the PSM is later attached to the DAPD without the PSM being attached/interacting for power/data transfer with the docking unit or the DAPD being attached/interacting for power/data transfer with the docking unit.

4. The system of claim 3, wherein the PSM is a detachable unit adapted to be installed in the DAPD or in the docking unit; and the user profile is a profile of a street patrol officer or an internal affairs investigator.

5. The system of claim 3, wherein the DAPD includes a unique identification code and wherein the docking unit is adapted to dynamically associate the unique identification code with a user.

6. The system of claim 5, wherein the docking unit is adapted to use the unique identification code in order to associate data received from the DAPD with the user.

7. The system of claim 1, wherein the docking unit is adapted to determine and report a status of at least one of: the memory and the power source unit.

8. The system of claim 1, wherein the docking unit is adapted to update software in the memory based on data received from a server on a connected network.

9. The system of claim 1, wherein the DAPD and the docking unit are adapted to encrypt and decrypt data stored on the PSM.

10. The system of claim 3, wherein the DAPD can be connected to, or disconnected from, the PSM, while the PSM is installed in the docking unit.

11. The system of claim 3, wherein the configuration data includes data related to an operation of the DAPD and data related to one or more user profiles and wherein an operation of the DAPD is controlled based on the data related to an operation of the DAPD and a profile selected from the one or more user profiles.

12. A method comprising:

simultaneously charging a power source unit in a power and storage module (PSM) and performing at least one of: reading information from the PSM and writing information to the PSM;

wherein the PSM includes a memory and a power source and is adapted to provide power to a data acquisition portable device (DAPD) and to store data received from the DAPD;

wherein the method further comprises storing configuration data in the memory and using the configuration data, by a controller included in the DAPD, to configure the DAPD;

wherein the PSM is attachable to the DAPD being deployed for data acquisition without the PSM being attached/interacting for power/data transfer with the docking unit or the DAPD being attached/interacting for power/data transfer with the docking unit, the PSM being attachable to the docking unit without the PSM being attached/interacting for power/data transfer with the DAPD or the docking unit being attached/interacting for power/data transfer with the DAPD, wherein the DAPD includes a unique identification code, the DAPD having a behavior and/or functionality configurable by the configuration data, wherein the PSM is adapted, when attached to the DAPD being deployed for data acquisition without the PSM being attached/interacting for power/data transfer with the docking unit or the DAPD being attached/interacting for power/data transfer with the docking unit, to provide power to the DAPD being deployed and to store, in the PSM's memory:

data acquired by the DAPD being deployed; and the respective unique identification code received from the DAPD being deployed; and wherein the docking unit is adapted, at least when attached to the PSM without the PSM being attached/interacting for power/data transfer with the DAPD or the docking unit being attached/interacting for power/data transfer with the DAPD, to:

charge the PSM's power source unit;

read, from the PSM's memory, the data previously acquired by the DAPD;

read, from the PSM's memory, a respective unique identification code previously received by the PSM;

associate the respective unique identification code with a user profile;

determine, based on the user profile, the configuration data to be provided to the DAPD, for configuring a behavior and/or functionality of the DAPD; and store the configuration data in the PSM's memory for being read out by the DAPD when the PSM is later attached to the DAPD without the PSM being attached/interacting for power/data transfer with the docking unit or the DAPD being attached/interacting for power/data transfer with the docking unit.

13. The method of claim 12, comprising transferring, to a server on a network, data received from the DAPD.

14. The method of claim 12, wherein the PSM module is a detachable unit adapted to be installed in the DAPD or in a docking unit, and the DAPD is a police radio or a body camera.

15. The method of claim 12, comprising dynamically associating a unique identification code included in the DAPD with a user.

16. The method of claim 15, comprising using the unique identification code in order to associate data received from the DAPD with the user.

17. The method of claim 12, comprising determining and reporting, by a docking unit attached to the PSM, a status of at least one of: the memory and the power source unit.

18. The method of claim 12, comprising updating software in the memory based on data received from a server on a connected network.

19. The method of claim 12, wherein the DAPD and the docking unit are adapted to encrypt and decrypt data stored on the PSM module.

20. The method of claim 12, wherein the DAPD can be connected to, or disconnected from, the PSM, while the PSM is installed in the docking unit.

21. The method of claim 12, wherein the configuration data includes data related to an operation of the DAPD and data related to one or more user profiles and wherein an operation of the DAPD is controlled based on the data related to an operation of the DAPD and to a profile selected from the one or more user profiles.

22. The system of claim 1, wherein the associate the respective unique identification code with a user profile comprises:

determine, from the respective unique identification code, an identification of a user of the corresponding DAPD; and determine the user profile from the identification of the user.

23. The system of claim 1, wherein the user profile is one of a number of user profiles stored in a storage system accessible to the docking unit.

* * * * *